Aug. 7, 1945.　　　R. W. BROWN　　　2,381,395
VULCANIZING MOLD
Filed July 8, 1943　　　6 Sheets-Sheet 1

Inventor
ROY W. BROWN
By Ely & Frye
Attorneys

Aug. 7, 1945.    R. W. BROWN    2,381,395
VULCANIZING MOLD
Filed July 8, 1943    6 Sheets-Sheet 6

Inventor
ROY W. BROWN

Patented Aug. 7, 1945

2,381,395

UNITED STATES PATENT OFFICE 2,381,395

VULCANIZING MOLD

Roy W. Brown, Akron, Ohio, assignor to The Firestone Tire & Rubber Company, Akron, Ohio, a corporation of Ohio Application July 8, 1943, Serial No. 493,931

10 Claims. (Cl. 18—34)

This invention relates to vulcanizing molds, and more especially it relates to molding apparatus for vulcanizing endless articles of relatively long length, which articles are interiorly reinforced.

The invention is of primary utility in the manufacture of endless treads or tracks for tracklaying vehicles, such as the vehicle known as a "half-trac." Such treads or tracks differ from the treads or tracks of combat vehicles known as "tanks" in that they are unitary endless structures instead of articulated; and are longitudinally flexible and inextensible. To this end, tracks of the character mentioned, which consist essentially of rubber or rubber-like composition, are interiorly reinforced with a plurality of convolutions of heavy wire or wire cable, and it is of primary importance that said convolutions be of uniform strength and length in order that all may bear an equal share of the load during service. Accordingly, during the fabrication of the track units, the convolutions of reinforcing material are applied under constant uniform tension, and the respective ends of the material are suitably anchored in the units so that the convolutions do not contract when severed from the supply spool of reinforcing material. It is one of the chief objects of this invention to provide vulcanizing and molding apparatus for articles of the character described, wherein the reinforcing elements are maintained under their initial uniform tension until the time that vulcanization of their rubber composition is completed.

Heretofore it has been difficult completely to vulcanize rubber articles of long length at one time, especially when the articles are endless. Thus it has been common practice to vulcanize such articles in successive contiguous or overlapping increments, with resulting non-uniformity of vulcanization. Furthermore it is impossible in this method of vulcanizing articles to maintain longitudinal reinforcing elements in the article under constant and uniform tension. Accordingly, another object of the invention is to provide molding apparatus wherein relatively long flexible articles of vulcanizable material may be vulcanized in their entirety by a single vulcanizing operation.

Traction tread units of the character described also have metal elements embedded therein, in spaced relation longitudinally of the unit, and to said metal elements an articulated sprocket chain or similar driving structure is secured in the completed unit.

It is essential that said embedded metal elements be accurately positioned so that the articulated driving member may be attached thereto. Accordingly it is another object of the invention to provide molding and vulcanizing apparatus adapted properly to position embedded metal elements in a structure of vulcanizable composition while the latter is being molded and vulcanized under pressure.

Further objects of the invention are to achieve superior quality in molded and vulcanized articles of the character mentioned; to provide for molding endless articles of relatively long length while they are maintained in true circular form; to provide for the manufacture of such articles at reduced cost; and to provide an improved vulcanizing mold for use in the manufacture of the articles. Other objects will be manifest as the description proceeds.

Referring to the drawings, particularly Figs. 1 to 5 thereof, there is shown a vulcanizing mold comprising a circular base plate 15 upon which is mounted a circumferential series of radially arranged bearing brackets of substantially U-shape. Said brackets are shown as eight in number, and are designated 16 and 17 alternately throughout the series. The leg portions of said bearing brackets extend upwardly, and the bearing portions of the brackets are at the tops of the respective legs thereof, the two bearings of each bracket being in alignment radially of the structure. Supported by said brackets upon the medial regions thereof, somewhat below their bearing portions, is a flat, annular, bed plate 18.

Figure 1:
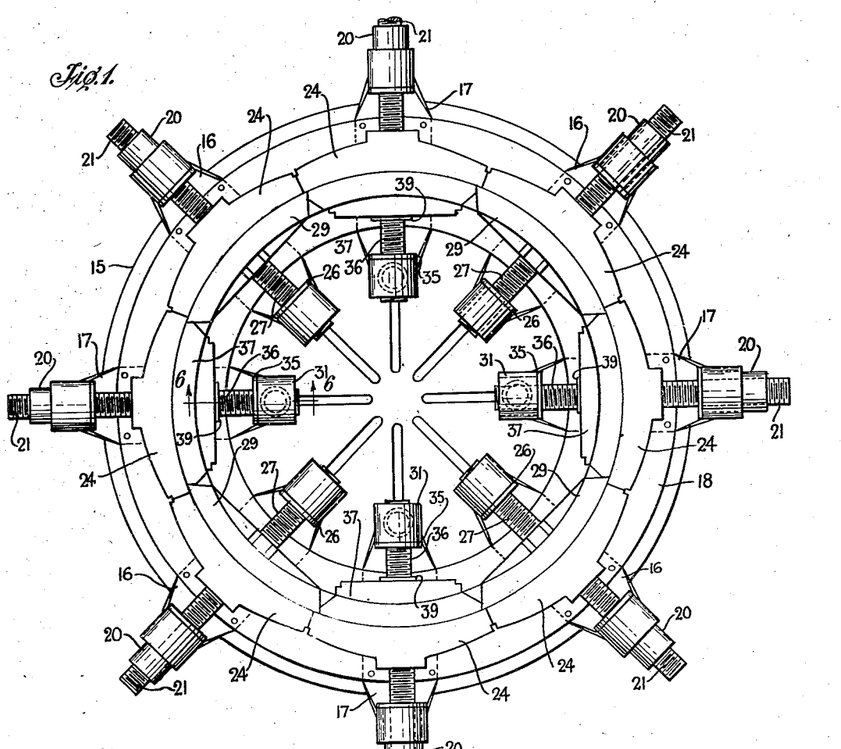
Fig. 1 is a plan view of an improved vulcanizing mold embodying the invention, in its closed or operative condition.
Figure 2:
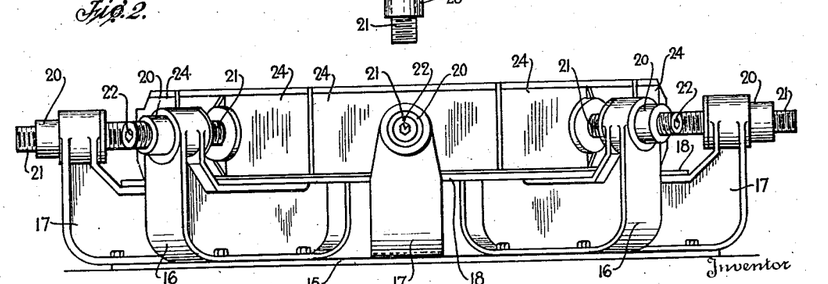
Fig. 2 is a side elevation thereof.
Figure 7:
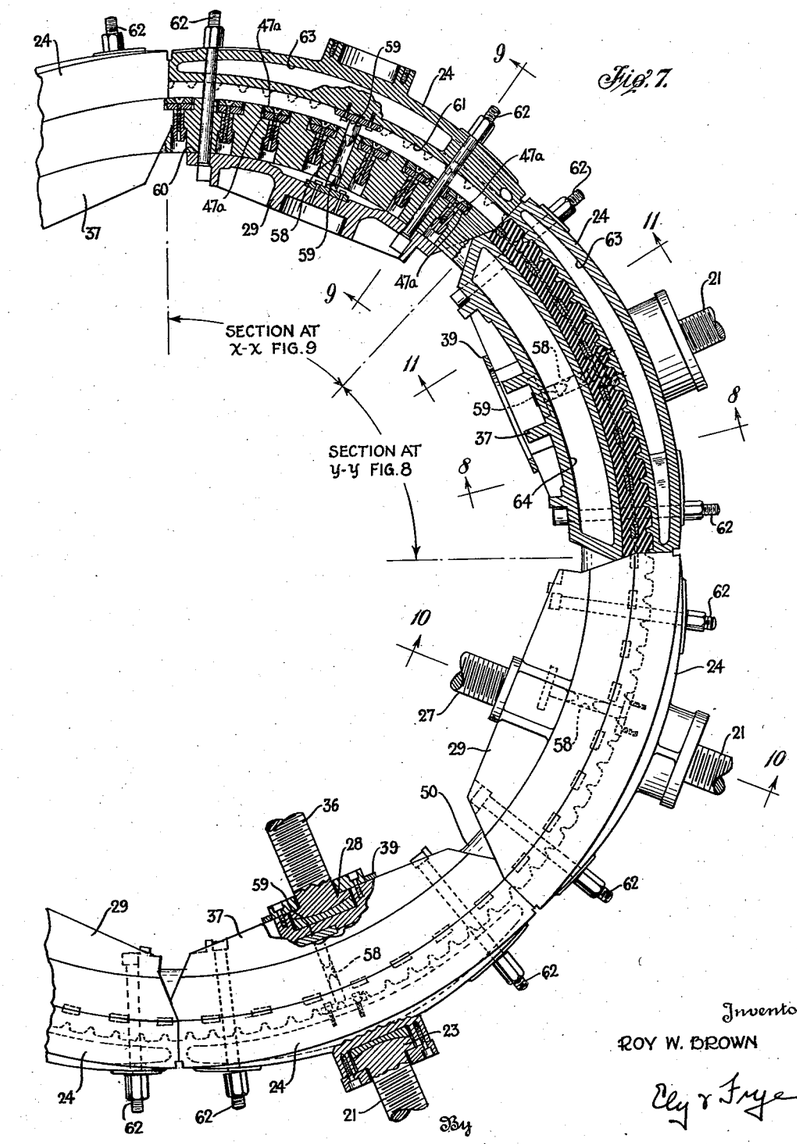
Fig. 7 is a fragmentary plan view of the mold segments of the vulcanizing mold, on a larger scale and in closed or operative position, and the work therein, parts being broken away and in section.
Figure 8:
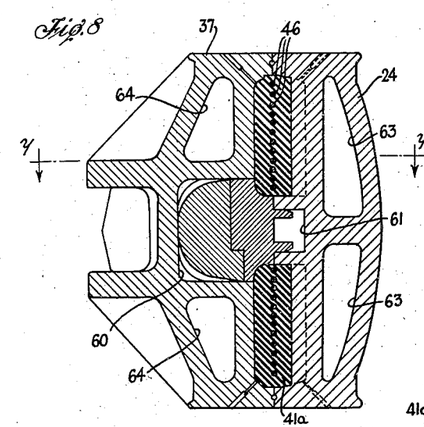
Fig. 8 is a section, on a larger scale, on the line 8—8 of Fig. 7.

The outermost bearing portions of the brackets 16, 17 are identical, each comprising an internally threaded bushing 20 in which a screw element 21 is received. The radially outermost end of each screw 21 is formed with a hexagonal socket 22 for receiving a suitable wrench by means of which the screw may be turned to move it radially inwardly and outwardly of the structure, relatively of the bushing 20 and the bracket supporting the same. The radially innermost end of each screw 21 is formed with a rounded head 23, Figs. 7 and 10, and swivelled on said head is a longitudinally arcuate mold segment that is designated as a whole by the numeral 24, said mold segment resting upon the bed plate 18. The mold segments are radially movable by means of the screws 21 and in their innermost positions they abut each other end to end and define a circular mold structure that is adapted to exert molding pressure upon the periphery of a circular work-piece, as shown in Figs. 1, 2 and 7, the work-engaging face of each mold segment being on the concave side thereof. The mold segments are moved radially outwardly to the inoperative position shown in Fig. 5 when finished work is to be removed from the mold and an unvulcanized work unit mounted therein.

The innermost bearing portions of the brackets 16 are substantially identical with the outermost bearing portions thereof. Thus each of said innermost bearing portions comprises an internally threaded bushing 26, and threaded into the latter is a screw 27. The radially innermost end of each screw 27 is formed with a hexagonal wrench socket (not shown), and the opposite end of the screw is formed with a rounded head 28, Fig. 10, in the same manner as the screws 21 previously described. Swiveled on the screw heads 28 are respective longitudinally arcuate mold segments, each designated as a whole by the numeral 29, said mold segments resting upon the bed plate 18. The mold segments 29 are alternate segments of a circular mold structure that consists of key segments and intermediate segments, the segments 29 being intermediate segments. The mold segments 29 are adapted to exert molding pressure upon the inner circumference of a circular work-unit, as shown in Figs. 1, 2 and 7, the work-engaging face of each mold segment being on the convex side thereof.

The innermost bearing portions of the brackets 17 differ from the brackets 16 in that they are provided with respective vertically movable bearing heads 31, each of which head is formed with a depending stem or post 32 that is slidably received in a vertical bore 33 in an enlarged region 17a on the inner end of the bracket 17. Said region 17a has a horizontal bore 34 extending transversely therethrough near the top thereof, which bore intersects the bore 33. A pin or other suitable tool (not shown) may be inserted through the bore 34 to constitute a support for the stem 32, and elements carried thereby, when said stem is in elevated position as shown in Fig. 4. Mounted in each bearing head 31 is an internally threaded bushing 35, and threaded through the latter is a screw 36, said screw and bushing being identical with the screws 27 and bushings 26 hereinbefore described. Swivelled on the head formed on the outer end of the screw 36 is a longitudinally arcuate mold segment that is designated as a whole by the numeral 37. The mold segments 37 are arranged in alternation with the mold segments 29, upon the bed plate 18, and constitute the key segments of the circular mold structure that is engagable with the inner circumference of a work-unit. The mold segments 29, 37 are so arranged that they are in opposition to respective mold segments 24 of the outer series of segments. The mold segments 37 are substantially similar to the mold segments 29 except for the shape of the respective end faces of the segments, which end faces are in abutting relation when all segments are in their radially outermost positions wherein they operatively engage the work unit. Thus the angular arrangement of the end faces of the segments is such that the intermediate segments 29 cannot be retracted or moved radially inwardly away from the work-unit until after the key segments 37 have been retracted. After the key segments have been moved to their radially innermost positions there still is not sufficient space for the intermediate segments 29 to be retracted sufficiently to clear the work-unit, as will be apparent upon reference to Fig. 3. It is for this reason that the key segments are carried by vertically movable bearing heads 31 whereby the said key sections may be elevated to a plane above the intermediate segments, as shown in Fig. 4, thereby enabling the intermediate segments to be moved to their radially innermost limits, as shown in Fig. 5.

Figure 3:
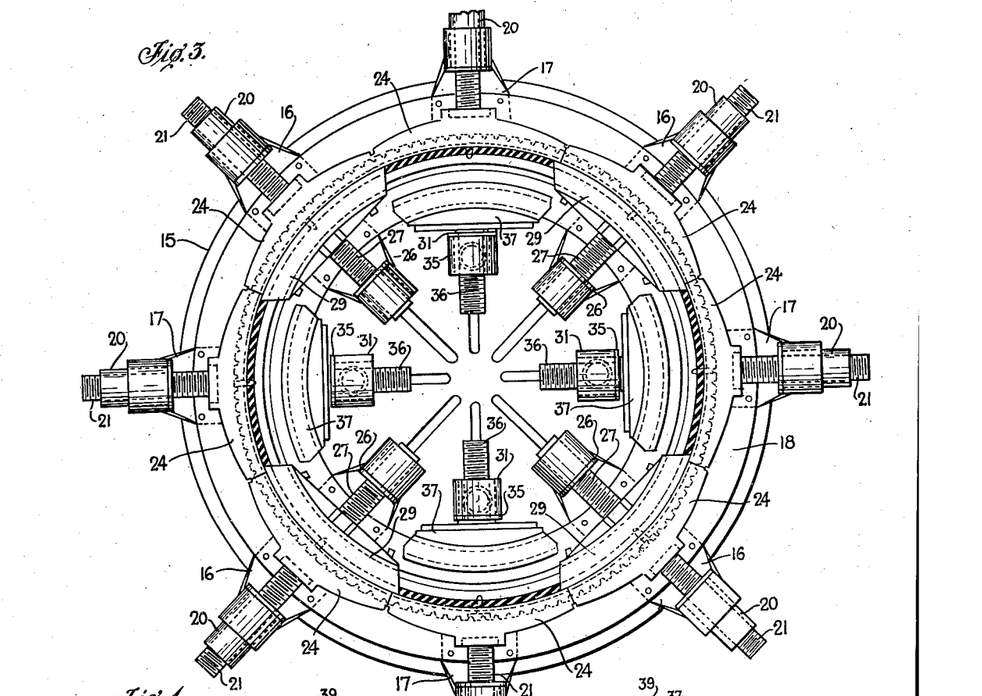
Fig. 3 is a plan view of the mold shown in Fig. 1, and the work therein, in the first phase of the opening of the mold to remove the finished work therefrom.
Figure 4:
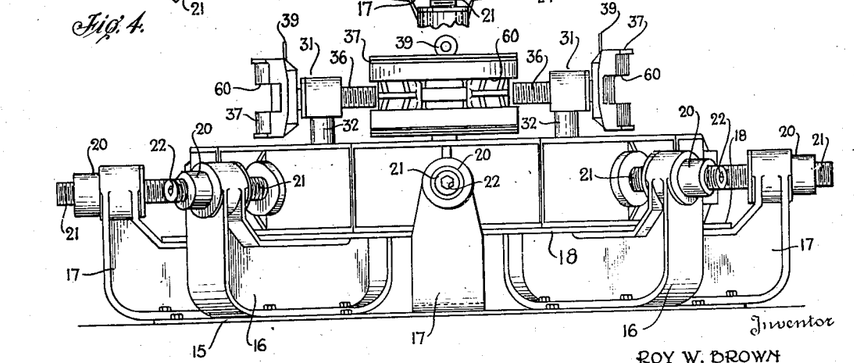
Fig. 4 is a side elevation of the structure in the condition shown in Fig. 3.
Figure 5:
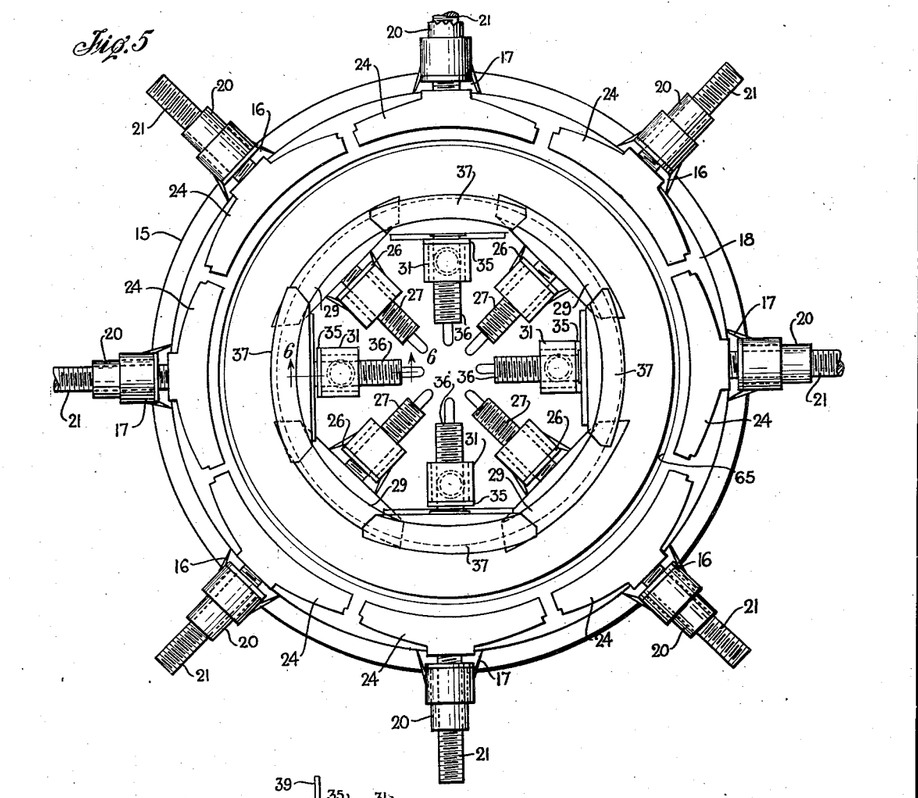
Fig. 5 is a plan view of the mold of the invention in its fully open condition.
Figure 6:
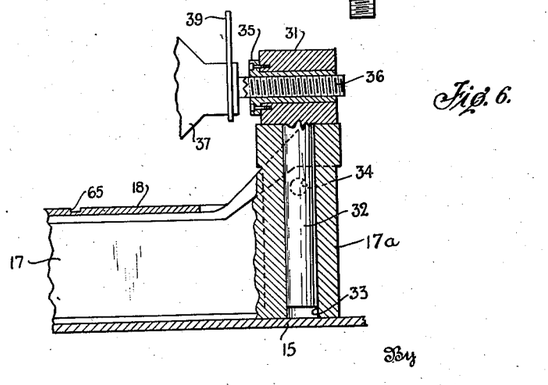
Fig. 6 is a section on the line 6—6 of Fig. 1.

The elevating of the key segments 37 from their lowered and retracted position to the elevated position shown in Figs. 3, 4 and 5 is effected by any suitable overhead hoisting mechanism (not shown), there being an apertured plate or eye 39 secured to the concave side of each of said segments, adjacent the swivel connection of the screw 36 thereto, for engagement with suitable hooks of said hoisting mechanism.

Figure 13:
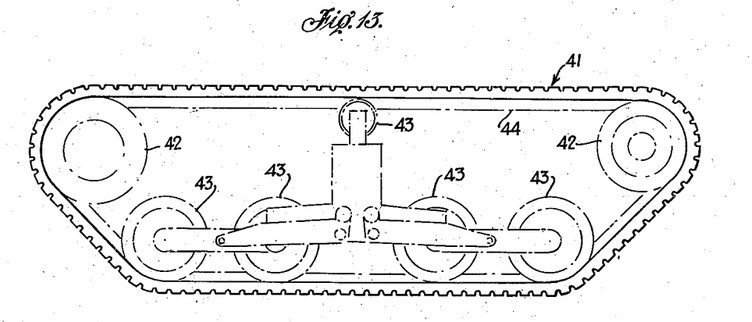
Fig. 13 is a side elevation of the finished work as it appears when mounted for use upon a vehicle, portions of the latter being shown in broken lines.
Figure 14:
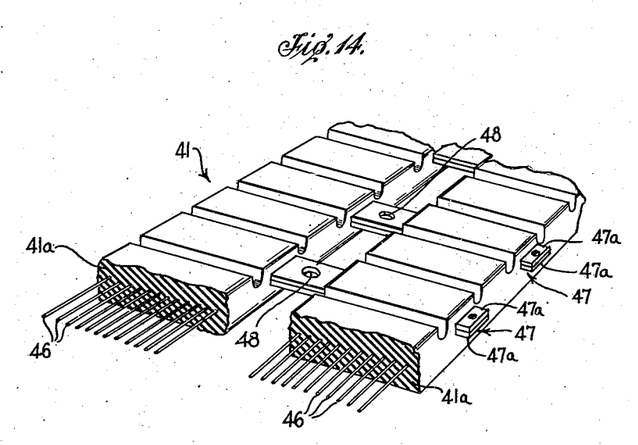
Fig. 14 is a fragmentary sectional perspective view of the finished work.

Referring now to Figs. 13 and 14 of the drawings, there is shown an endless track or tread 41 such as is molded and vulcanized in the apparatus of the invention. In Fig. 13 the track 41 is shown as it appears when mounted for use upon a vehicle, the elements of the latter that engage the track being shown in broken lines. Said vehicle elements as shown consist of sprocket wheels 42, 42, one or both of which are power driven, and a series of bogie wheels 43, 43. In the finished track, metal clips are attached at spaced points longitudinally of the track and project inwardly from the inner side thereof so as to effect driving engagement with the teeth of the sprockets 42. Since said clips are not a part of the invention it is not believed that a detail showing thereof is necessary. However, the inner limit of the series of clips is indicated by the broken line 44, Fig. 13.

Figures 10, 11, 12:
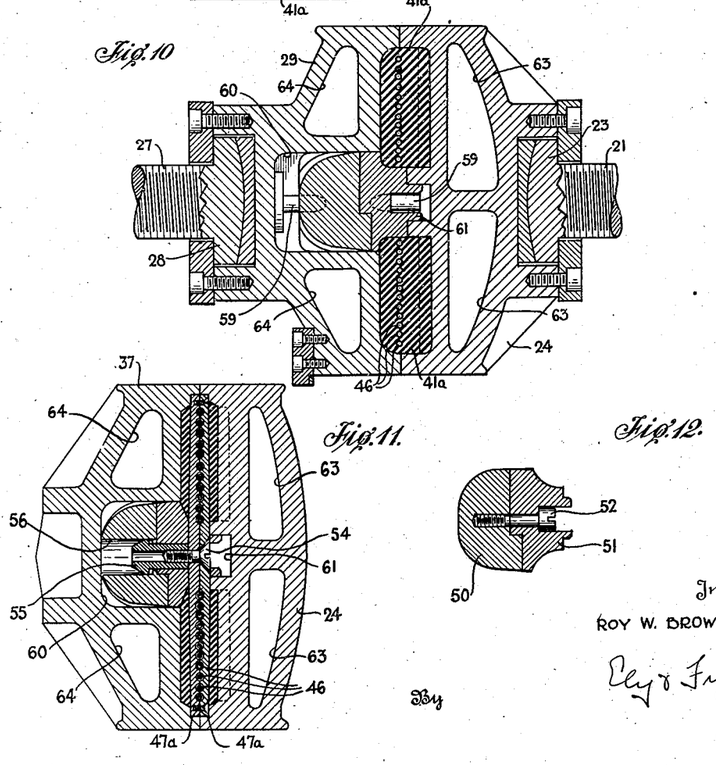
Fig. 10 is a section, on a larger scale, on the line 10—10 of Fig. 7.
Fig. 11 is a section, on a larger scale, on the line 11—11 of Fig. 7.
Fig. 12 is a section of an endless ring, and a segmental ring operatively associated therewith, which rings support the work during fabrication thereof and while the work is in the vulcanizing mold.

As is best shown in Fig. 14, the track 41 comprises two identical, parallel, endless track elements 41a, 41a, that are arranged side by side in spaced relation to each other. Said track elements are composed essentially of tough abrasion-resisting, vulcanized rubber composition, either natural or synthetic, and are reinforced by a plurality of circumferentially extending convolutions of metal wire or cable 46, 46. For attaching the driving clips aforementioned to the track, the latter is provided with a circumferential series of metal inserts 47, 47 that are disposed transversely of the track and are embedded within the structures of the respective elements 41a thereof. The inserts 47 span the space between said track elements 41a and serve to maintain the latter in properly spaced apart relation. The opposite ends of the inserts 47 project somewhat from the respective lateral faces or margins of the track, as shown in Fig. 14, and between each track element each insert is formed with a medially arranged countersunk aperture 48 to receive a suitable bolt (not shown) that is employed to secure a driving clip thereto. As is best shown in Figs. 7 and 11, the inserts 47 each consist of two coextensive elements 47a, 47a that are formed, on their confronting faces, with corresponding transverse grooves in which the wires or cables 46 are received, the elements 47a of the respective inserts being clamped together so as tightly to grip said cables.

In the fabrication of the unvulcanized track 41, an annular power driven support or drum (not shown) is provided, and removably mountable upon said support is an endless metal ring 50. The peripheral face of said ring is transversely stepped or shouldered, and mounted upon said peripheral face is a circumferential series of longitudinally arcuate ring segments 51 arranged in end to end relation, the confronting surfaces of the endless ring and the ring segments 51 being complementally shaped. Cap screws 52, Fig. 12, extending through the segments 51 and threaded into the ring 50 maintain the ring and segments in assembled relation. At spaced points circumferentially of the assembly the segments 51 are transversely slotted at their periphery to receive the inserts 47.

During the first steps of building a track 41, the inserts 47 are not mounted upon the ring structure. This enables plies of unvulcanized rubber composition to be assembled on the supporting structure at opposite sides of the ring segments 51 without hindrance. After the proper number of rubber plies are assembled, the innermost elements 47a of the mold inserts are mounted upon the ring segments 51 and temporarily secured thereto, the transverse grooves of said inserts facing outwardly. The next step is to apply the wires or cables 46, and these cables preferably are covered or insulated with rubber composition that is partly vulcanized. The wires 46 are applied circumferentially of the track under uniform determined tension, the respective ends of the wires, or convolutions thereof, being suitably anchored to insert elements 47a so as to retain said wires under tension. After the wires 46 are in place the outer insert elements 47a are mounted over the inner insert elements, and secured to the latter and to the ring assembly by respective screws 54 that extend through the inserts and the ring segments 51 and are threaded into shouldered nuts 55 that are received in respective counterbored radial apertures 56 in the endless ring 50, and the ring segments, as shown in Figs. 7 and 11. Thereafter the rubber composition of the track elements 41a is applied over the wires 46 and inserts 47, the fabrication being finished when a sufficient thickness of rubber is obtained.

Thereafter the unvulcanized track, together with the endless ring 50 and ring segments 51 attached thereto, are removed as a unit from the rotatable drum or support upon which the track was built, and mounted in the vulcanizing mold hereinbefore described while the outer and inner mold segments thereof are in the fully retracted positions shown in Fig. 5. When the work is being mounted in the mold it is essential that the ring structure 50, 51 be determinately arranged angularly with relation to the mold segments, and to this end the said ring structure is formed with a circumferential series of radial bores 58, and receivable in said bores, from opposite ends thereof, are dowels 59 secured to the inner mold segments 29, 37, and the outer mold segments 24, said dowels being located substantially centrally of the confronting molding faces of the two series of mold segments. The confronting faces of the respective series of mold segments are formed with molding cavities for receiving and molding the rubber composition of the track elements 41a, and for receiving the end portions of the inserts 47 that project beyond the lateral faces of the track elements. Each of the inner mold segments is centrally formed with a deep longitudinally extending groove 60 in which the radially inner portion of the ring structure 50, 51 is received, and the outer series of mold segments is formed with a narrower and shallower groove 61 in which the peripheral portion of the segmental ring 51 is received. The medial region of the segmental ring 51 centrally divides the molding cavity in the mold, and thus constitutes a part of the molding surface that shapes the two elements 41a of the work-unit. The arrangement enables the work to be positioned centrally of the mold in a vertical direction, the dowels 59 also enabling the work to be properly positioned angularly of the mold.

Figure 9:
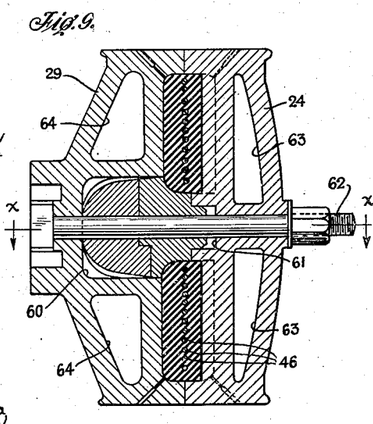
Fig. 9 is a section, on a larger scale, on the line 9—9 of Fig. 7.

The respective inner mold segments 29, 37 are formed with radial bores at the respective ends thereof, and the outer mold segments 24 are formed with similar bores. Furthermore the ring structure 50, 51 is formed with a circumferential series of radial bores, and when a work unit is in the mold and the mold segments are moved toward each other to apply molding pressure to the work unit, said bores are in axial alignment and receive bolts 62, 62, Figs. 7 and 9, for a purpose which presently will be apparent. The outer mold segments 24 comprise steam chambers 63, and the inner mold segments comprise steam chambers 64, which chambers, when filled with steam, supply the heat for vulcanizing the rubber composition of the work unit in the mold. Suitable flexible piping (not shown) is provided for circulating steam through the several mold segments, as is well understood by those familiar with this art.

After the work unit has been mounted within the mold as previously described, the mold is closed upon the work. In this operation, the first step is to move the intermediate mold segments 29 outwardly into engagement with the inner circumference of the work. Then the key segments 37 may be lowered from the elevated position shown in Fig. 4 to a position in the same plane as said intermediate segments 29. The key segments are then moved radially outwardly into engagement with the work, in which position they are in end-to-end relation with the intermediate segments. Finally, the segments 24 of the outer series are moved radially inwardly into engagement with the work. It will be understood that radial movement of the mold segments is effected by turning of the screws 21, 27 and 36 by means of a wrench inserted into the socket in the outer end of the respective screws. The said screws are turned in succession, a power-driven wrench preferably being employed for the purpose. Owing to the stiffness of the unvulcanized rubber of the work unit, it is not possible immediately to move the mold segments to their ultimate molding positions. In practice, however, steam is constantly circulating through the mold segments so that they are in heated condition when applied to the work. This causes the rubber composition of the work rapidly to soften and become flowable, so that a subsequent turning of the screws 21, 27 and 36 will move the mold segments to their ultimate molding positions wherein the work is completely enclosed, the mold then appearing as shown in Fig. 1 of the drawings. At this time the bolts 62 may be applied to the mold so as more securely to hold the mold segments in engagement with the work. Any overflow of the rubber composition at the bottom of the mold is received in a groove 65 formed in the top face of the bed plate 18, concentrically of the axis thereof. The order of the foregoing operations is reversed to open the mold and remove the finished product therefrom.

In removing the finished track from the mold, the endless ring structure also is removed with it. Thereafter the screws 52 and 54 and the nuts 55 are removed, which enables the endless ring 50 to be removed from the series of ring segments 51, the latter then being removable individually.

From the foregoing it will be seen that the mold is so constructed and arranged that the wires 46 in the article are maintained under tension from the time they are applied until the time that vulcanization is completed. Furthermore, the metal inserts are held in proper position at all times notwithstanding molding pressure applied to the rubber structures, and vulcanization is effected concurrently throughout the entire length of the endless track. Because the track is molded while in true circular form, it will not be subjected to as severe flexing stresses during use as would be the case if it were vulcanized in longitudinally flat increments. Thus the invention produces an article of superior quality, and achieves the other advantages set out in the foregoing statement of objects.

Modification may be resorted to without departing from the spirit of the invention, or the scope thereof as defined by the appended claims.

What is claimed is:

1. A vulcanizing mold of the character described comprising the combination of an outer circumferential series of mold segments arranged about a vertical axis, an inner circumferential series of mold segments arranged about the same axis, the two series being in the same plane in the operative condition of the mold, means for individually moving the mold segments of each series in a radial direction, and means for moving some of the segments of the inner series out of the plane of the other segments.

2. A mold of the character described comprising the combination of an outer circumferential series of mold segments arranged about a vertical axis, an inner circumferential series of mold segments arranged about the same axis, the two series being in the same plane in the operative condition of the mold, said inner series comprising a plurality of key segments and a plurality of intermediate segments, means for individually moving the mold segments of both series in a radial direction to and from work-engaging position, and means for elevating the key segments of the inner series to a position above the plane of other segments.

3. A mold of the character described comprising a bed plate, an outer circumferential series of arcuate mold segments supported thereon and arranged about a vertical axis, an inner circumferential series of arcuate mold segments supported on said bed plate and arranged about the aforesaid vertical axis, the two series being in the same plane in the operative condition of the mold, said inner series comprising a plurality of key segments and a plurality of intermediate segments, respective screw elements to which said segments are swivelled adapted to move said segments in a radial direction to and from work-engaging position, bearing members for said screw elements, and means for positioning the bearing members of the key segments at an elevated position whereby the key segments may be positioned above the plane of the other segments.

4. A combination as defined in claim 3 including respective posts upon which the bearing members of the key segments are mounted, and respective brackets in which said posts are slidably mounted for vertical movement.

5. A mold of the character described comprising two concentric series of arcuate mold segments, the segments of one series being arranged in opposition to the respective segments of the other series, all of said segments being disposed in the same horizontal plane in the closed condition of the mold, the confronting faces of the opposed segments being formed with molding surfaces adapted to shape an annular article positioned therebetween, individual means for moving the respective segments of each series radially to open and close the mold, and means for positioning some of the segments of the inner series out of the plane of the remainder of the segments to enable maximum inward radial movement of all the inner segments during opening of the mold.

6. A combination as defined in claim 5 in which the inner series of mold segments comprises key segments and intermediate segments, and vertically adjustable supports for the key segments enabling them to be elevated to a position above the plane of the other segments of the mold.

7. A mold of the character described comprising two concentric series of arcuate mold segments, means for moving the segments of each series radially, from and toward the other series, to open and close the mold, the confronting arcuate faces of the opposed segments being formed with molding cavities adapted to receive and shape an annular article positioned therebetween, and a ring-shaped structure positionable interiorly of the mold between the two series of segments and in operative engagement with the segments of each series to divide the molding cavity of the mold into two parallel separate annular molding portions, parts of said ring structure constituting molding surfaces for shaping portions of said article.

8. A mold of the character described comprising two concentric series of arcuate mold segments, means for moving the respective segments of each series radially, from and toward the other, to open and close the mold, the confronting faces of the opposed segments being formed with molding surfaces adapted partly to shape an annular article positioned therebetween, said confronting faces also formed with respective longitudinally extending grooves in which a molding element is receivable, and a ring-shaped structure positionable between the two series of segments and partly seatable in said grooves, portions of said ring structure constituting molding surfaces for shaping portions of said article, said ring-shaped structure being composed of separable parts to enable it to be disengaged from the molded article.

9. A combination as defined in claim 8 wherein the ring-shaped structure comprises an endless ring, and a circumferential series of ring-segments mounted upon the periphery thereof.

10. A combination as defined in claim 8 including inter-engaging means on the mold segments and the ring-shaped structure adapted to position the latter in determinate angular relation to the mold segments during the closing of the mold.

ROY W. BROWN.